United States Patent [19]

Rooklyn

[11] Patent Number: 4,702,951

[45] Date of Patent: Oct. 27, 1987

[54] PRODUCT HAVING GROUNDED STATIC-FREE WORK SURFACE

[75] Inventor: Jack Rooklyn, Northridge, Calif.

[73] Assignee: Industrial Management Co., Chatsworth, Calif.

[21] Appl. No.: 613,088

[22] Filed: May 22, 1984

Related U.S. Application Data

[63] Continuation-in-part of Ser. No. 286,611, Jul. 24, 1981, Pat. No. 4,456,944, which is a continuation-in-part of Ser. No. 180,962, Aug. 25, 1980, abandoned.

[51] Int. Cl.[4] ........................ B32B 15/04; B32B 23/02

[52] U.S. Cl. .................................... 428/193; 428/138; 428/256; 428/409; 428/457; 428/460

[58] Field of Search ............... 428/133, 138, 137, 193, 428/192, 157, 537.1, 167, 457, 458, 464, 460, 479.6, 474.4, 479.3, 409

[56] References Cited

U.S. PATENT DOCUMENTS

| | | | |
|---|---|---|---|
| 1,609,222 | 11/1926 | Taylor | 428/139 |
| 2,241,312 | 6/1941 | Loty | 428/138 |
| 3,046,174 | 7/1962 | Brooks et al. | 428/157 |
| 3,578,523 | 5/1971 | Ohse | 428/537.1 X |
| 4,089,721 | 5/1978 | Sauder | 428/537.1 X |
| 4,125,964 | 11/1978 | Waggoner | 428/193 X |
| 4,126,725 | 11/1978 | Shiflet | 428/138 X |
| 4,128,696 | 12/1978 | Goebel et al. | 428/520 X |

FOREIGN PATENT DOCUMENTS

| | | | |
|---|---|---|---|
| 58-42457 | 3/1983 | Japan | 428/138 |

*Primary Examiner*—Lorraine T. Kendell

*Attorney, Agent, or Firm*—Evanns & Walsh

[57] ABSTRACT

A product which is one having a static-free grounded work surface. There is a first component which is a relatively thick particle board but of a predetermined thickness. Overlying the particle board is wire mesh screen of particular gauge mesh with its edge portions secured to peripheral parts of the particle board. Overlying the wire mesh screen is a relatively thin plastic sheet of melamine which provides the working surface. A static charge is dissipated through the plastic laminate and through the wire mesh screen to ground connections.

7 Claims, 3 Drawing Figures

FIG. 1
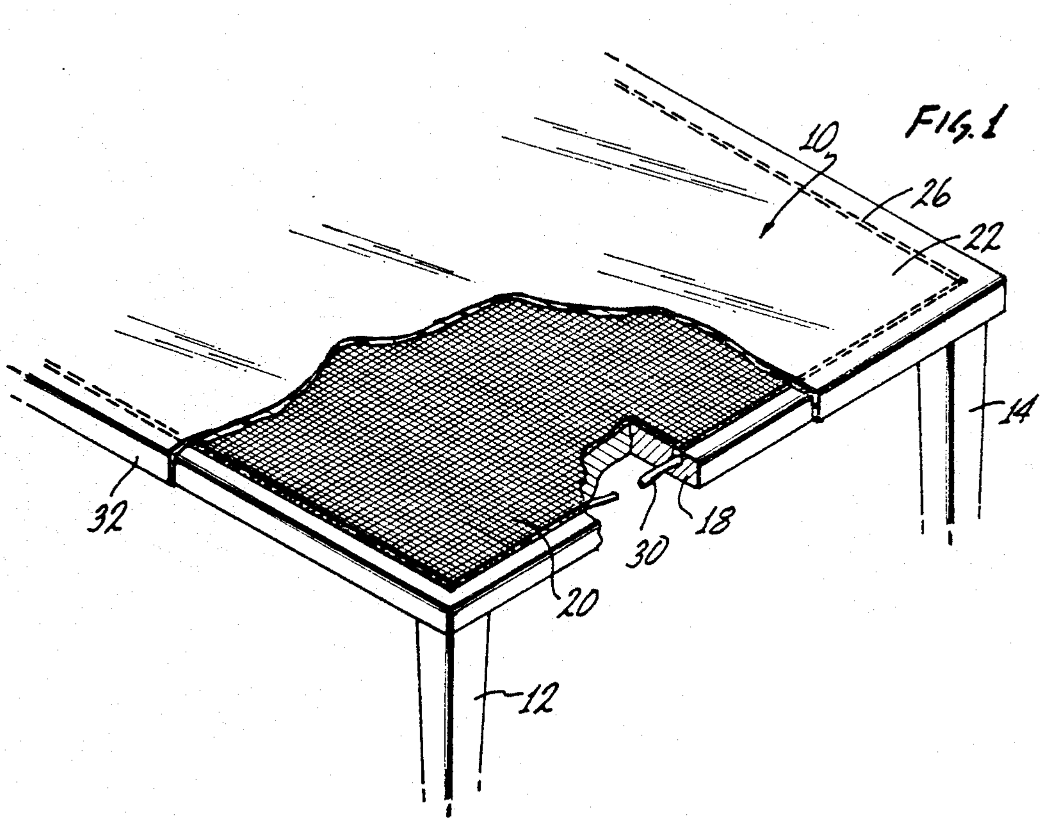
FIG. 2
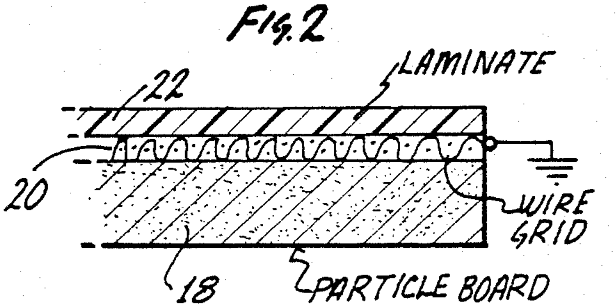
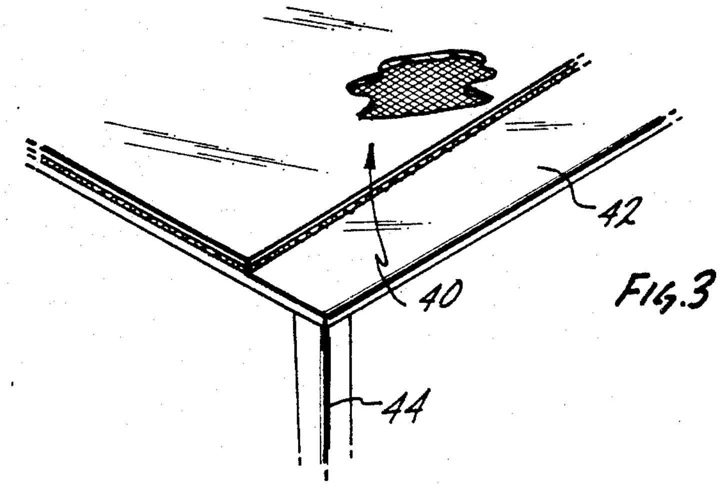
FIG. 3

PRODUCT HAVING GROUNDED STATIC-FREE WORK SURFACE

BACKGROUND OF THE INVENTION

This application is a continuation-in-part of application Ser. No. 286,611, filed July 24, 1981, now U.S. Pat. No. 4,456,944, which is a continuation-in-part of application Ser. No. 180,962, filed Aug. 25, 1980, now abandoned.

1. Field of the Invention

The field of the invention is that of work surfaces which are electrically conductive and that can be grounded to drain off static electricity. The product forms a static-free work surface.

2. Description of the Prior Art

Equipment is known in the prior art in the way of tables or platforms having conductive working surfaces which can be grounded. This type of equipment is used in industrial plants where there may be involved many small electronic parts operating on low voltage, such as solid-state chips, integrated circuits, etc. Normally, there is a static electricity charge present which is sufficiently strong to damage or destroy such a part. Thus, grounding of the working surface is necessary. Static charges may be as high as 5,000 volts or higher.

To the extent that conductive tops or surfaces are known in the prior art, they are relatively expensive and short lived; further, they are subject to certain deficiencies in not being well adapted for use with small parts which tend to roll off, and the surface often may be too cold to the touch. The tops may not be sufficiently smooth to be adequate for their purpose or effective to adequately drain off the static charge and, particularly, at the correct rate.

In a typical type of prior art product, a commercially available laminate is utilized and a layer of carbon is painted on the back of the laminate which forms the product that is then used as a conductive work surface. This product has certain deficiencies, including that the carbon on the underside of the layer will attack silver. Also, the product with the carbon on it cannot be used in a clean room since it will contaminate the atmosphere. Further, the carbon layer which has been painted on will eventually dissipate into the atmosphere and lose its conductivity.

With respect to the prior art, room for improvements also lie in the areas of economical fabrication and production of the product and also in the area of control of the rate of dissipation of static charge from the work surface. This factor may be critical for certain applications.

A preferred form of the invention is described in detail hereinafter, the product being one which overcomes the deficiencies as referred to in the foregoing as well as having other advantages.

SUMMARY OF THE INVENTION

In a preferred exemplary form of the invention as described herein, a particular product is realized providing a conductive work surface. The product is formed utilizing the top surface of high-density particle board which may have a thickness of approximately 1 3/16 inches. The product uses no carbon fiber or chemical impregnation that would affect some components and contaminate cleaning environments. The product includes a wire grid which is set over the top surface of the particle board. The wire grid may be 14–18 mesh. This material in the 18 mesh may have a thickness of substantially 0.0475 inch. The particle board is provided with a groove spaced inwardly from its edges to within ¼ inch of the edges. The edge parts of the wire mesh are inserted into the groove and firmly held by a spline positioned in the groove over the part of the mesh that is in the groove.

The melamine sheet that provides the surface of the product may have a thickness of 0.020 inches. It has low dielectric strength, that is, it acts as an insulator. This gives the characteristic of slower dissipation of the charge. The low dielectric constant means that the charge can get through it better. It slows down the electric charge to lower the rate of dissipation of the static charge.

The product as described may be constructed as a top of a table having the usual four legs; if desired, the front edges may be radius edged.

The product may be also constructed in the form of a pad to be laid on the surface of a work table. In this form of the product, the particle board is preferably approximately ½ inch in thickness and self-edged on three sides, and it may have a front edge made of hardwood with a ½ inch radius.

In light of the foregoing, the primary object of the invention is to provide an improved product having a static-free work surface.

A further object is to provide such a product having a controllable dissipation rate of static charge.

Another object is to realize a product as defined which uses readily available materials, which is relatively inexpensive and which is easy to fabricate, assemble and produce.

Further objects and advantages will be apparent from the following detailed description and drawings.

BRIEF DESCRIPTION OF THE DRAWINGS

FIG. 1 is an isometric view, partly cut away, of an embodiment of the invention which is a work table having a static-free work surface;

FIG. 2 is an enlarged partial schematic view illustrating the components of the invention;

FIG. 3 is a partial isometric view of a modified form of the invention constructed in the form of a pad to be laid on a work table, a section of the pad being cut away.

DESCRIPTION OF PREFERRED EMBODIMENTS AND MODE OF OPERATION

FIG. 1 of the drawings is a view of a representative product constructed as described in the foregoing Summary of the Invention. The product shown is in the form of a table, having a top work surface 10 and having legs such as shown at 12 and 14.

FIG. 2 illustrates the basic components of the work surface as described in the foregoing. Numeral 18 describes the layer of particle board which may have a thickness of approximately 1 3/16 inches. Numeral 20 identifies the wire grid or wire mesh screen which may have a mesh of 14–18 gauge and may be substantially 0.04575 inches in thickness, by way of example. The wire mesh screen is laid over the particle board. Numeral 22 designates the laminate or plastic layer, that is, the melamine sheet, which is a commercially available product, and is positioned over the wire mesh screen as shown.

The commercial product is a layer or lamination of a plastic material, which is a sheet of melamine. This is a standard product in which the melamine sheet is bonded to one side of a sheet of paper. The product is readily available commercially. In a typical form of the product, there are several sheets of impregnated Kraft paper on the bottom side of the sheet; this is called a substrate, these sheets being bonded to the melamine plastic by pressure. This product is available from several commercial sources. It is available under the trade names "FORMICA" and NEVAMAR".

The preferred wire mesh used is made of aluminum and copper, depending on the rate of dissipation that is desired. This rate may be given in the ratio of ohms to ground, that is, resistance in ohms to ground. Some users may even specify that there must be a predetermined dielectric constant to the mesh material. The surface resistant to ground may be, for example, $1.9 \times 10^9$ ohms. So the resistance is very high, being 1,900,000,000 ohms.

The particle board 18 has a groove formed in it adjacent to its periphery spaced inwardly from its edges as identified at 26. The edges of the wire mesh screen 20 are positioned in or forced into the groove, and then an element, such as a spline, which is a member as indicated at 30, is positioned in the groove over the edge part of the wire mesh screen to hold it in position. The element or member 30 may be made of suitable material to serve this purpose as a spline.

As shown in FIG. 1, strips of material corresponding to the melamine laminate product 22 are attached to the side edges of the table in a position as designated at 32 so that the edges of the strip are flush with the edges of the top sheet 22. This material be of any suitable color, such as white or gray, so that the finished product has an attractive appearance.

Firm grounding bolts are set in two corners of the product's underside. Preferably, the dissipative surface or conductive top is grounded to an earth ground with a known type of ground cord containing one megohm, ½ watt resistor. There is provided a practical permanent conductive work surface.

The grounding bolts (not shown) may be positioned as described in the foregoing at opposite corners of the underside of the top.

The product, as described, has all of the characteristics as set forth in the foregoing, and its capabilities are such that it achieves all of the objectives that have been set forth.

The product made or constructed as described assures continuous absolute grounding while dissipating static at a rate that is safe for sensitive components. Static charges dissipate through the plastic surface to the wire grid and out one or more of convenient grounding bolts on the other side of the product. This positive design guarantees continual grounding that cannot be interrupted.

The dissipation time for a typical conductive tote box carrying 5,000 volts of static charge is 0.003 seconds after touching the surface.

The product as described is resistant to most solvents.

FIG. 3 shows a modified embodiment of the product in the form of a pad 40 which may be laid directly on the top surface 42 of a table having legs, such as the leg 44. The product as identified as 40 in the form of a pad has construction which is very similar to that described above and illustrated in FIG. 2 with the primary exception that the particle board has a lesser thickness being approximately ½ inch thick, by way of example. The pad 40, as shown in FIG. 3, is a partly schematic construction, preferably corresponding to that described in connection with FIGS. 1 and 2.

From the foregoing, those skilled in the art will readily understand the nature and construction of the invention, its utilization, and the manner in which it achieves the capabilities and objectives as set forth in the foregoing.

The foregoing disclosure is representative of preferred forms of the invention and is to be interpreted in an illustrative rather than a limiting sense, the invention to be accorded the full scope of the claims appended hereto.

What is claimed is:

1. As an article of manufacture, a product providing a conductive surface capable of dissipating static charges at a rate providing safety for sensitive components, comprising in combination a first member of relatively thick non-conductive material adapted for providing at least a part of a working surface, a second member in the form of a relatively thin flexible sheet of wire mesh material placed over the first member, the wire mesh member being secured to the edges of the first member, a third laminate member in the form of a plastic sheet of melamine, the said second member of wire mesh material being laminated under the third member of laminated plastic, the third member having a thickness whereby to enable static charges from components on the working surface to dissipate through the plastic surface to the wire mesh grid and to a grounding connection.

2. An article as in claim 1 wherein the plastic sheet is laminated over the entire surface of the wire mesh material to provide a permanent conductive work surface.

3. An article as in claim 2 wherein the first member has a continuous peripheral groove formed in it, the edges of the said sheet of mesh material being positioned in the groove and means retaining the mesh material in the groove.

4. An article as in claim 3 wherein the wire mesh member is of 14–16 gauge.

5. An article as in claim 4 wherein the wire mesh material is made of aluminum and copper providing a predetermined rate of static charge dissipation.

6. As an article of manufacture, a product providing a conductive surface capable of dissipating static charges at a rate providing safety for sensitive components comprising, in combination, a first member of relatively thick non-conductive particle board having a thickness of approximately 1 3/16 inches for providing at least a part of a working surface, a second member in the form of a relatively thin flexible wire mesh material of gauge in the range of 14–16 placed over the first member, edge portions of the wire mesh member being secured adjacent the peripheral edges of the first member, a third laminate member in the form of a plastic sheet of melamine material in a position laminated over the second member of wire mesh material, the third member having a thickness of approximately 0.020 inches whereby to provide for static charges which can dissipate through the plastic surface to the wire mesh and to a grounding connection.

7. An article as in claim 6 wherein the first member has a continuous peripheral groove formed in it adjacent to its periphery, the edges of said sheet of mesh material being positioned in the groove and means in the form of a spline positioned for retaining the mesh material in the groove.

* * * * *